United States Patent
Lian

(10) Patent No.: US 8,331,356 B2
(45) Date of Patent: Dec. 11, 2012

(54) METHOD, APPARATUS AND SYSTEM FOR TRANSMITTING A GLOBAL TEXT TELEPHONE SIGNAL

(75) Inventor: Lun Lian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/174,409

(22) Filed: Jun. 30, 2011

(65) Prior Publication Data

US 2011/0256892 A1    Oct. 20, 2011

Related U.S. Application Data

(63) Continuation of application No. PCT/CN2009/075602, filed on Dec. 15, 2009.

(30) Foreign Application Priority Data

Dec. 30, 2008  (CN) ......................... 2008 1 0189297

(51) Int. Cl.
H04L 12/66  (2006.01)
(52) U.S. Cl. ........................................ 370/352; 455/466
(58) Field of Classification Search .................. None
See application file for complete search history.

(56) References Cited

U.S. PATENT DOCUMENTS

| | | | |
|---|---|---|---|
| 5,604,796 A * | 2/1997 | Yamazaki | 379/215.01 |
| 6,526,137 B1 * | 2/2003 | Copley | 379/221.03 |
| 6,963,633 B1 * | 11/2005 | Diede et al. | 379/88.03 |
| 7,277,690 B1 * | 10/2007 | Arslan | 455/337 |
| 7,382,752 B2 * | 6/2008 | Melhuish | 370/335 |
| 7,451,093 B2 * | 11/2008 | Kraemer | 704/500 |
| 8,165,574 B2 * | 4/2012 | Hallenstal et al. | 455/418 |
| 2002/0080777 A1 * | 6/2002 | Gaiser et al. | 370/352 |
| 2003/0002650 A1 * | 1/2003 | Gruchala et al. | 379/245 |
| 2004/0198323 A1 * | 10/2004 | Himanen et al. | 455/412.1 |
| 2005/0195801 A1 | 9/2005 | Chu et al. | |
| 2005/0229046 A1 * | 10/2005 | Marke et al. | 714/100 |
| 2005/0237980 A1 | 10/2005 | Melhuish | |
| 2005/0246179 A1 * | 11/2005 | Kraemer | 704/500 |
| 2005/0268198 A1 * | 12/2005 | Marke et al. | 714/746 |

(Continued)

FOREIGN PATENT DOCUMENTS

CN    101296205 A    10/2008

(Continued)

OTHER PUBLICATIONS

"Transcoder Based CTM Implementation" published in Apr. 2001 to Nokia and Nortel Networks.*

(Continued)

Primary Examiner — Ian N Moore
Assistant Examiner — Dung B Huynh
(74) Attorney, Agent, or Firm — Brinks Hofer Gilson & Lione

(57) ABSTRACT

The present invention relates to communication technologies, and discloses a method, an apparatus, and a system for transmitting a signal to ensure normal communication between the calling party and the called party. The method includes: A first node sends Global Text Telephone (GTT) signal encoded in a Cellular Text Telephone Modem (CTM) format to a second node after the first node receives the GTT signal and if transmission between the first node and the second node is based on an Internet Protocol (IP) network. The present invention is primarily applicable to the GTT service.

6 Claims, 3 Drawing Sheets

U.S. PATENT DOCUMENTS

| | | | |
|---|---|---|---|
| 2006/0258400 A1* | 11/2006 | Lee | 455/557 |
| 2006/0268845 A1* | 11/2006 | He et al. | 370/352 |
| 2006/0276218 A1* | 12/2006 | Goris et al. | 455/550.1 |
| 2007/0116018 A1* | 5/2007 | Doleh et al. | 370/401 |
| 2007/0259657 A1* | 11/2007 | Cheng | 455/419 |
| 2008/0076453 A1* | 3/2008 | Cai et al. | 455/466 |
| 2008/0260113 A1* | 10/2008 | Jean et al. | 379/88.13 |
| 2009/0075703 A1* | 3/2009 | Furbeck | 455/569.2 |
| 2009/0265543 A1* | 10/2009 | Khetawat et al. | 713/151 |

FOREIGN PATENT DOCUMENTS

| | | | |
|---|---|---|---|
| CN | 101442727 A | 5/2009 | |
| CN | 101442727 B | 11/2011 | |
| EP | 1 592 270 A1 | 11/2005 | |
| EP | 1592270 A1 | 11/2005 | |

OTHER PUBLICATIONS

"3GPP TR 26.967 V8.0.1" published in Dec. 2007.*

"Cellular Text Telephone Modem—The Solution for Supporting Text Telephone Functionality in GSM Networks" published in 2001 to Matthias et al.*

Office Action issued in corresponding Chinese Patent Application No. 200810892975; issued Dec. 11, 2009 (including English Translation).

Office Action issued in corresponding Chinese Patent Application No. 200810892975; issued Dec. 6, 2010 (including English Translation).

Office Action issued in corresponding Chinese Patent Application No. 200810892975; issued Mar. 30, 2011 (including English Translation).

Granted claims in corresponding Chinese Patent Application No. 200810892975 (including English Translation and Verification of Translation).

Written Opinion of the International Searching Authority issued in corresponding PCT Patent Application No. PCT/CN2009/075602, mailed Mar. 18, 2010.

International Search Report issued in corresponding PCT Patent Application No. PCT/CN2009/075602, mailed Mar. 18, 2010.

Chinese Office Action issued in corresponding Chinese Patent Application No. 200810189297.5, received Dec. 11, 2009.

Chinese Office Action issued in corresponding Chinese Patent Application No. 200810189297.5, mailed Dec. 6, 2010.

Chinese Office Action issued in corresponding Chinese Patent Application No. 200810189297.5, mailed Mar. 30, 2011.

* cited by examiner

METHOD, APPARATUS AND SYSTEM FOR TRANSMITTING A GLOBAL TEXT TELEPHONE SIGNAL

CROSS-REFERENCE TO RELATED APPLICATIONS

This application is a continuation of International Application No. PCT/CN2009/075602, filed on Dec. 15, 2009, which claims priority to Chinese Patent Application No. 200810189297.5, filed on Dec. 30, 2008, both of which are hereby incorporated by reference in their entireties.

FIELD OF THE INVENTION

The present invention relates to communications technologies, and in particular, to a method, an apparatus, and a system for transmitting signal.

BACKGROUND OF THE INVENTION

The Text Telephone Type (TTY)/Text telephone Devices for the Deaf (TDD) service provides mobile text voice communication for the deaf. Currently, TTY standards include V.21, EDT, and Baudot standards.

In the process of implementing a TTY service, text information (in the T.140 format) of a user is encoded by using the Baudot standard and sent to a network. The inventor finds that after the Nb/Nc interface between one Mobile Switching Center (MSC) and another MSC is IP-based, a Baudot signal needs to be transmitted in the IP network if a transmission method in the prior art is applied. However, because the Internet Protocol (IP) network generally employs a compressed voice codec format such as Adaptive Multi-Rate (AMR) which provides a very high compression ratio, the Baudot signal is impaired drastically, so that it is hard to recover the Baudot signal correctly on the called side.

SUMMARY OF THE INVENTION

The embodiments of the present invention provide a method, an apparatus, and a system for transmitting a signal to enable normal communication between the calling party and the called party.

The embodiments of the present invention are based on the following technical solution:

A method for transmitting a signal includes:
sending, by a first node, a Global Text Telephone (GTT) signal encoded in a Cellular Text Telephone Modem (CTM) format to a second node after the first node receives the GTT signal and if transmission between the first node and the second node is based on an IP network.

An apparatus for transmitting a signal includes:
a receiving unit, configured to receive a GTT signal; and
a sending unit, configured to send the GTT signal encoded in a CTM format to a next hop of the GTT signal if determining that transmission between the apparatus and the next hop is based on an IP network.

An apparatus for transmitting a signal includes:
a receiving unit, configured to receive a GTT signal encoded in a CTM format; and
a converting unit, configured to convert the GTT signal in the CTM format into the GTT signal in a format of an international text telephone modem standard, where the format of the international text telephone modem standard includes V.21, EDT, Bell 103, V.23, DTMF, V.18, and Baudot.

A system for transmitting a signal includes:
an end office of mobile services, configured to send a GTT signal encoded in a CTM format to a gateway office if determining that transmission between the end office of mobile services and the gateway office is based on an IP network; and
the gateway office, configured to receive the GTT signal in the CTM format from the end office of mobile services.

An apparatus for transmitting a signal includes:
a receiving unit, configured to receive a GTT signal;
a converting unit, configured to determine that the GTT signal received by the receiving unit are in a format of an international text telephone modem standard, and convert the GTT signal into a GTT signal in a CTM format; and
a sending unit, configured to send the converted GTT signal in the CTM format, and send a service message that carries an identifier of the GTT signal in the CTM format, where the identifier indicates that the GTT signal is in the CTM format.

By using the method, apparatus and system for transmitting a signal under the present invention, after the first node receives the GTT signal, the first node sends the GTT signal encoded in a CTM format to the second node if the transmission between the first node and the second node is based on an IP network. Therefore, after the Nb/Nc interface is IP-based, because the CTM signal has strong anti-interference abilities, the impact caused by the IP network on the GTT signal is mitigated, and normal communication is ensured between the calling party and the called party.

BRIEF DESCRIPTION OF THE DRAWINGS

To illustrate the technical solution under the present invention more clearly, the following describes the accompanying drawings involved in description of the embodiments of the present invention. Apparently, the accompanying drawings described below are exemplary only and not exhaustive. Persons of ordinary skill in the art can derive other drawings from such accompanying drawings without any creative effort.

DETAILED DESCRIPTION OF THE EMBODIMENTS

Figure 1:
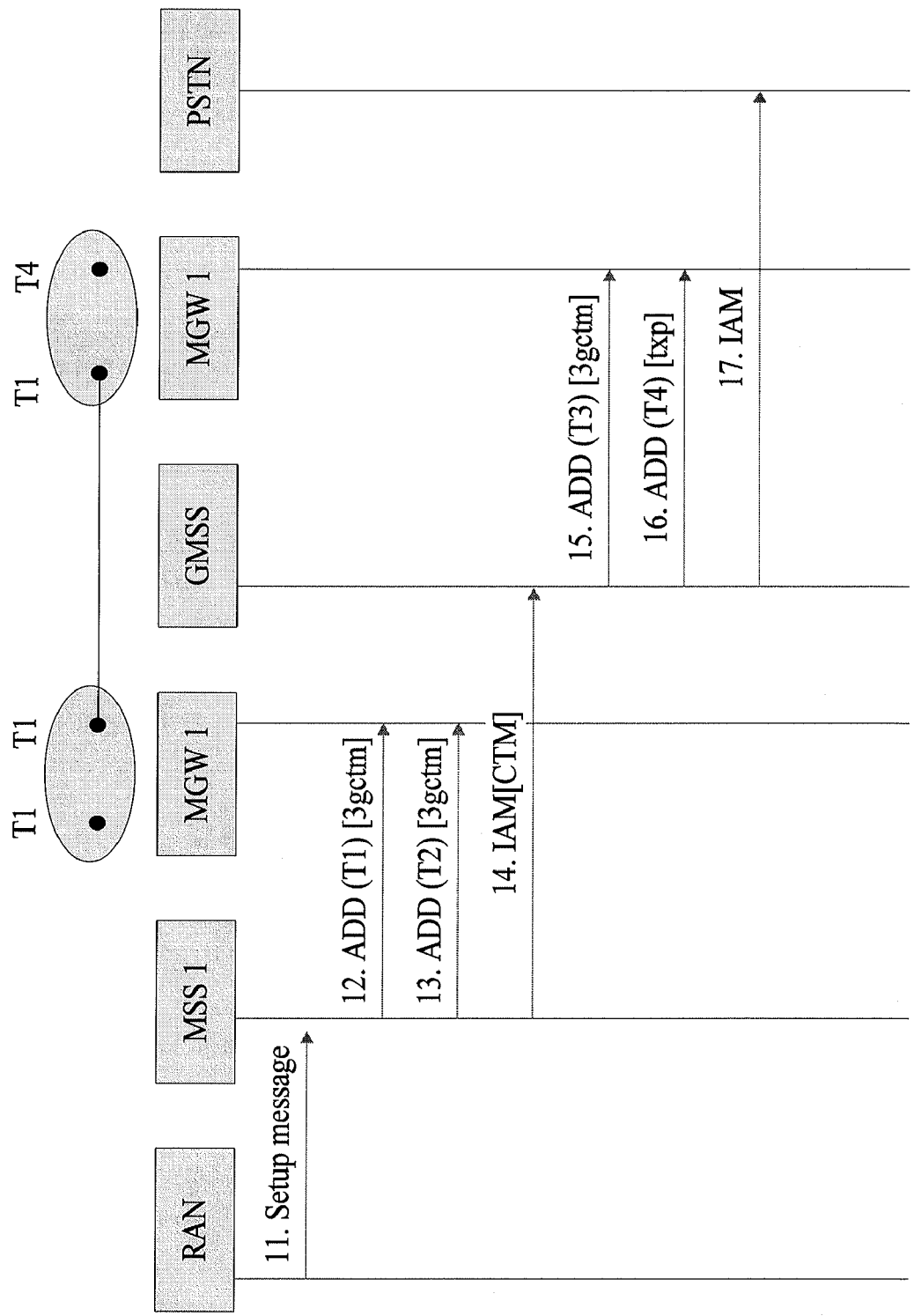
FIG. 1 is a flowchart of a method for transmitting a signal in a second embodiment of the present invention.

To make the technical solution under the present invention clearer, the following describes the embodiments of the present invention with reference to the accompanying drawings. Apparently, the embodiments provided below are not exhaustive, and persons of ordinary skill in the art can derive other embodiments of the present invention from such embodiments without any creative effort.

In the first embodiment of the present invention, after the first node receives the GTT signal, the first node sends a MT signal encoded in a CTM format to the second node if the transmission between the first node and the second node is based on an IP network, so as to mitigate the impact caused by the IP network on the GTT signal and ensure normal communication between the calling party and the called party.

In order for the second node to correctly know that the received GTT signal is in the CTM format, the first node may send a service message that carries an identifier of the GTT signal in the CTM format to the second node. The identifier indicates that the GTT signal transmitted between the first node and the second node are in the CTM format.

In the embodiments of the present invention, the service message may be extended to carry the identifier of the GTT signal in the CTM format. The service message may be extended in at least the following modes:

Mode 1: An Initial Address Message (IAM) or a Session Initiation Protocol Invite (SIP-I INVITE) message carries the identifier of the GTT signal in the CTM format. The identifier indicates that the GTT signal transmitted between the first node and the second node are in the CTM format.

In practice, a Bits P field in a Forward Call Indicators field in the IAM message or SIP-I INVITE message may be extended to carry the identifier of the GTT signal in the CTM format. In this field, "1" indicates that the GTT signal is in the CTM format, and "0" is a reserved value; or, "0" indicates that the GTT signal is in the CTM format, and "1" is a reserved value.

Mode 2: An Address Complete Message (ACM) or a SIP-I 180/183 message carries the identifier of the GTT signal in the CTM format. The identifier indicates that the GTT signal transmitted between the first node and the second node are in the CTM format.

In practice, a Bits F field in an Option Backward Call Indicators field in the ACM or SIP-I 180/183 message may be extended to carry the identifier of the GTT signal in the CTM format. In this field, "1" indicates that the GTT signal is in the CTM format, and "0" is a reserved value; or, "0" indicates that the GTT signal is in the CTM format, and "1" is a reserved value.

In practice, other messages or other fields in the foregoing messages may be extended to carry the identifier of the GTT signal in the CTM format.

The first node is an end office of mobile services and the second node is a gateway office, or, the first node is a gateway office and the second node is an end office of mobile services. The end office of mobile services refers to an MSC with which a GTT user is registered, and the gateway office refers to the switching equipment for processing services between two networks and may be an MSC. Moreover, one end of the gateway office is connected to the IP network, and the other end is connected to a Time Division Multiplexing (TDM) network such as a Public Switched Telephone Network (PSTN).

If the first node is an end office of mobile services and the second node is a gateway office, when the first node sends the GTT signal in the CTM format to the second node, the first node determines that the received GTT signal is in the CTM format, and then sends the signal to the gateway office, and sends a service message that carries an identifier of the GTT signal in the CTM format to the gateway office.

Afterward, the gateway office determines an encoding format of the GTT signal according to the identifier, and converts the GTT signal in the CTM format into the GTT signal in a format of an international text telephone modem standard, where the format of the international text telephone modem standard includes V.21, EDT, Bell 103, V.23, DTMF, V.18, and Baudot.

When the gateway office converts the GTT signal in the CTM format into the GTT signal in the format of the international text telephone modem standard, the gateway office makes a judgment first, namely, the gateway office judges whether the transmission between the gateway office and a third node is based on a TDM network by judging whether the third node belongs to a PSTN. If the third node belongs to a PSTN, it is determined that the transmission between the gateway office and the third node is based on a TDM network. Therefore, the gateway office converts the GTT signal in the CTM format into the GTT signal in the format of the international text telephone modem standard. The third node is the next hop of the GTT signal (namely, a message receiver).

If the first node is a gateway office and the second node is an end office of mobile services, the first node sends the GTT signal in the CTM format to the second node in this way: The gateway office determines that the received GTT signal is in the format of the international text telephone modem standard, and converts the GTT signal into a GTT signal in the CTM format, and then sends the GTT signal in the CTM format to the end office of mobile services.

By using the method for transmitting a signal in the first embodiment of the present invention, after the first node receives the GTT signal, the first node sends the GTT signal encoded in the CTM format to the second node if the transmission between the first node and the second node is based on an IP network. Therefore, after the Nb/Nc interface is IP-based, because the CTM signal has strong anti-interference abilities, the impact caused by the IP network on the GTT signal is mitigated, and normal communication is ensured between the calling party and the called party.

The following describes the signal transmission process in the case that a GTT terminal serves as a calling party and a called party.

The second embodiment deals with the process of implementing the GTT service, assuming that the GTT terminal serves as a calling party.

As shown in FIG. 1, the method for implementing the GTT service in the second embodiment includes the following steps:

Step 11: The GTT terminal initiates a call, and sends a Setup message to a Mobile Switching Center Server (MSS) 1 through a Radio Access Network (RAN). The Setup message indicates that the transmitted GTT signal is in the CTM format.

Step 12: After receiving the Setup message, the MSS1 adds a calling endpoint T1 through an ADD (T1)[3gctm] message, and requests the MGW1 to allocate resources. The message carries a threegctm packet. In the threegctm packet, a Text Transport parameter indicates that the transmitted GTT signal is in the CTM format.

Steps 13-14: The MSS1 judges whether the transmission between the MSS1 and the next-hop node is IP-based transmission. If so, the MSS1 adds the threegctm packet into the ADD (T2)[3gctm] message, through which an outgoing endpoint T2 is added. In the threegctm packet, the Text Transport parameter indicates that the transmitted GTT signal is in the CTM format. Meanwhile, the MSS1 sends an IAM message to the Gateway office Mobile Switching Center Server (GMSS) connected to the PSTN. The IAM message carries an identifier of the GTT signal in the CTM format.

Step 15: After receiving the IAM message, the GMSS determines that the transmitted GTT signal is in the CTM format, and adds an incoming endpoint T3 through an ADD (T3)[3gctm] message. The message carries a threegctm packet. In the threegctm packet, the Text Transport parameter indicates that the transmitted GTT signal is in the CTM format.

Steps 16-17: After determining that the called party is outside the local office, the GMSS initiates an outgoing trunk procedure. If the office direction is a PSTN office direction, the GMSS adds an incoming endpoint T4 through an ADD (T4)[txp] message which carries a txp packet. The txp packet indicates that the transmitted GTT signal is in the Baudot format. The GMSS sends the IAM message to the PSTN.

The third embodiment deals with the process of implementing the GTT service, assuming that the GTT terminal serves as a called party.

Figure 2:
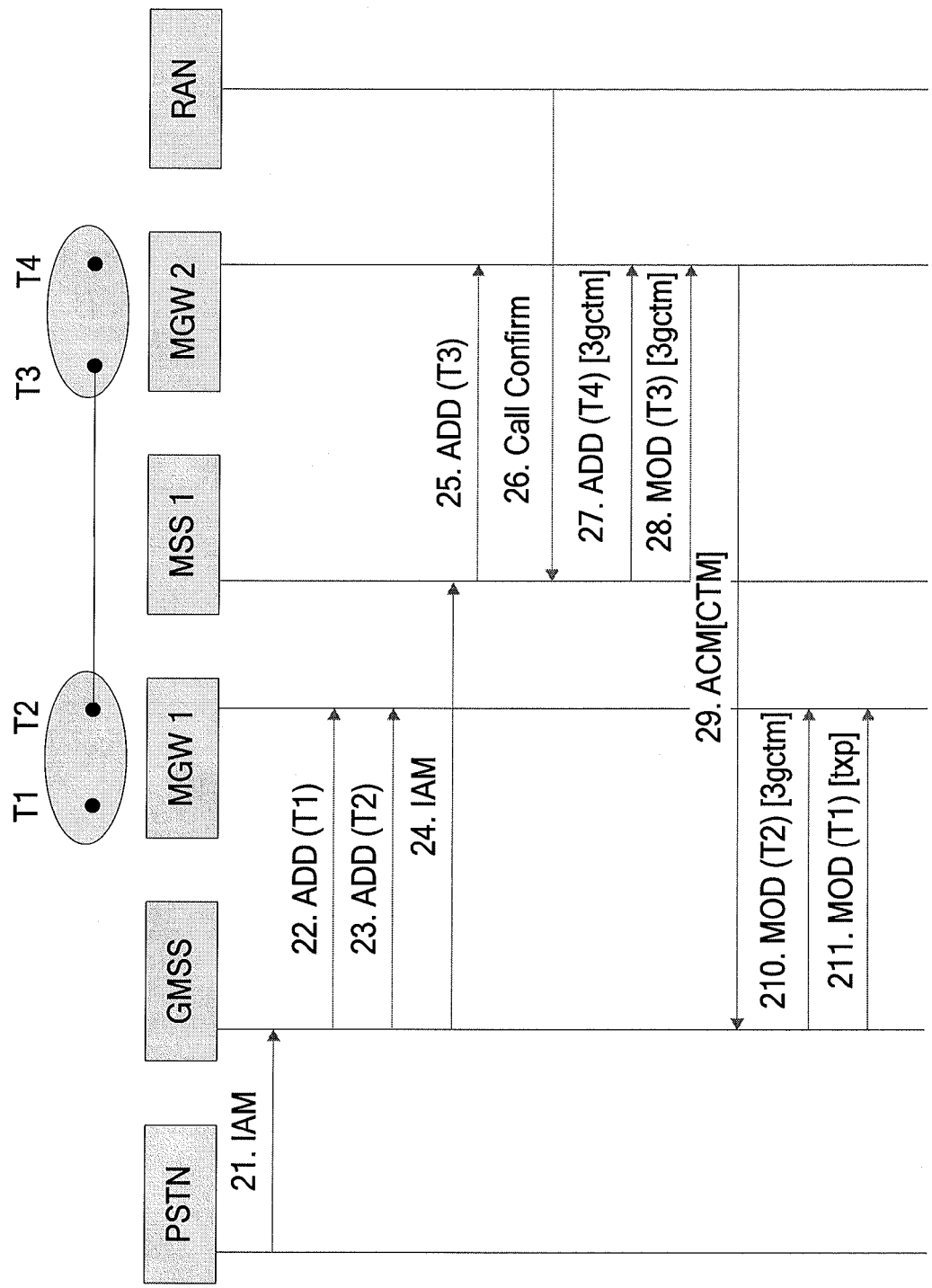
FIG. 2 is a flowchart of a method for transmitting a signal in a third embodiment of the present invention.

As shown in FIG. 2, the method for implementing the GTT service in the third embodiment includes the following steps:

Steps 21-22: After receiving the IAM message from the PSTN, the GMSS connected to the PSTN does not know whether the transmitted GTT signal is in the CTM format, and hence adds an endpoint T1 of an ordinary attribute through an ADD(T1) message.

Step 23: The GMSS knows that the called party is outside the local office, but does not know whether the transmitted GTT signal is in the CTM format, and hence adds an endpoint T2 of an ordinary attribute through an ADD(T2) message.

Step 24: The GMSS sends the IAM message to the MSS1.

Step 25: After receiving the IAM message, the MSS1 does not know whether the transmitted GTT signal is in the CTM format, and hence adds an endpoint T3 of an ordinary attribute through an ADD(T3) message.

Step 26: The RAN sends a Call Confirm message to the MSS1, indicating whether the transmitted GTT signal is in the CTM format.

Steps 27-28: The MSS1 adds another called endpoint T4 through an ADD(T4)[3gctm] message which carries a threegctm packet. In the threegctm packet, the Text Transport parameter indicates that the transmitted GTT signal is in the CTM format. Afterward, the MSS1 modifies the attribute of the endpoint T3 through a MOD(T3)[3gctm] message which carries a threegctm packet. In the threegctm packet, the Text Transport parameter indicates that the transmitted GTT signal is in the CTM format.

Step 29: After the called party rings, the MSS1 notifies the GMSS through an ACM message (ACM[CTM]). The ACM message carries an identifier of the GTT signal in the CTM format.

Steps 210-211: After receiving the ACM message, the GMSS modifies the attribute of the endpoint T2 through a MOD(T2)[3gctm] message which carries a threegctm packet. The threegctm packet indicates that the transmitted GTT signal is in the CTM format. Afterward, the GMSS modifies the attribute of the endpoint T1 through a MOD(T1)[txp] message which carries a txp packet, indicating that the transmitted GTT signal is in the Baudot format.

In the case that the MSCs are interconnected through a SIP-I protocol, the procedure that occurs when the GTT terminal serves as a calling party or a called party is the same as the procedure described in the second embodiment and the third embodiment each except for the following difference: When the GTT terminal serves as a calling party, the IAM message in the second embodiment is replaced with a SIP-I INVITE message; when the GTT terminal serves as a called party, the ACM message in the third embodiment is replaced with a SIP-I 180/183 message.

Therefore, through the method for transmitting a signal in the second embodiment and the third embodiment above, after the Nb/Nc interface is IP-based, because the CTM signal has strong anti-interference abilities, the impact caused by the IP network on the GTT signal is mitigated, and normal communication is ensured between the calling party and the called party.

Persons of ordinary skill in the art should understand that all or part of the steps of the method under the present invention may be implemented by a program instructing relevant hardware. The program may be stored in a computer readable storage medium. When the program runs, the steps of the method specified in any of the embodiments above can be performed. The storage medium may be a magnetic disk, a Compact Disk-Read Only Memory (CD-ROM), a Read Only Memory (ROM), or a Random Access Memory (RAM).

Figure 3:
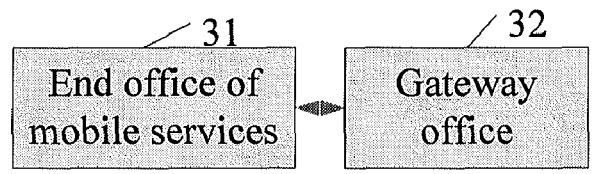
FIG. 3 shows a system for transmitting a signal in a fourth embodiment of the present invention.

As shown in FIG. 3, a system for transmitting a signal is provided in the fourth embodiment of the present invention. The system includes: an end office of mobile services 31, configured to send a GTT signal encoded in a CTM format to a gateway office 32 if determining that transmission between the end office of mobile services and the gateway office is based on an IP network; and the gateway office 32, configured to receive the GTT signal in the CTM format from the end office of mobile services.

The end office of mobile services 31 is further configured to send a service message that carries an identifier of the GTT signal in the CTM format to the gateway office, where the identifier indicates that the GTT signal transmitted between the end office of mobile services and the gateway office are in the CTM format. The gateway office 32 is further configured to receive the service message that carries the identifier of the GTT signal in the CTM format.

The gateway office 32 is further configured to determine the encoding format of the GTT signal according to the identifier, and convert the GTT signal in the CTM format into a format of an international text telephone modem standard, where the format of the international text telephone modem standard includes V.21, EDT, Bell 103, V.23, DTMF, V.18, and Baudot.

Through the system for transmitting a signal in the fourth embodiment, after the Nb/Nc interface is IP-based, because the CTM signal has strong anti-interference abilities, the impact caused by the IP network on the GTT signal is mitigated, and normal communication is ensured between the calling party and the called party.

Figure 4:
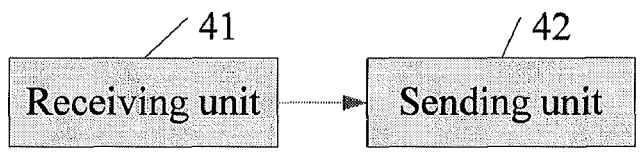
FIG. 4 shows an apparatus for transmitting a signal in a fifth embodiment of the present invention.

As shown in FIG. 4, an apparatus for transmitting a signal is provided in the fifth embodiment of the present invention. The apparatus includes: a receiving unit 41, configured to receive a GTT signal; and a sending unit 42, configured to send the GTT signal encoded in a CTM format to a next hop of the GTT signal if determining that transmission between the apparatus and the next hop is based on an IP network. In practice, the apparatus shown in FIG. 4 may be an MSC or another device of similar functions.

In order for the next hop to correctly know that the received GTT signal is in the CTM format, the sending unit 42 is further configured to send a service message that carries an identifier of the GTT signal in the CTM format to the next hop. The identifier indicates that the GTT signal transmitted between the apparatus and the next hop are in the CTM format.

As in the first embodiment, the service message may be an IAM, a SIP-I INVITE message, an ACM, or a SIP-I 180/183 message, and the message is extended in the same way as in the first embodiment.

Through the apparatus for transmitting a signal in the fifth embodiment, after the Nb/Nc interface is IP-based, because the CTM signal has strong anti-interference abilities, the impact caused by the IP network on the GTT signal is mitigated, and normal communication is ensured between the calling party and the called party.

Figure 5:
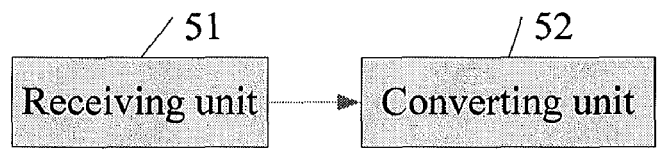
FIG. 5 shows an apparatus for transmitting a signal in a sixth embodiment of the present invention.

As shown in FIG. 5, an apparatus for transmitting a signal is provided in the sixth embodiment of the present invention.

The apparatus includes: a receiving unit 51, configured to receive a GTT signal in the CTM format; and a converting unit 52, configured to convert the GTT signal in the CTM format into a GTT signal in a format of an international text telephone modem standard, where the format of the international text telephone modem standard includes V.21, EDT, Bell 103, V.23, DTMF, V.18, and Baudot.

In addition, when the sender of the GTT signal in the CTM format also sends a service message that carries an identifier of the GTT signal in the CTM format, the receiving unit 51 is further configured to receive the service message that carries the identifier of the GTT signal in the CTM format, where the identifier indicates that the GTT signal transmitted between the apparatus and the next hop are in the CTM format. In this case, the converting unit 52 is specifically configured to determine an encoding format of the GTT signal according to the identifier of the GTT signal in the CTM format, and convert the GTT signal in the CTM format into a GTT signal in a format of an international text telephone modem standard.

Figure 6:
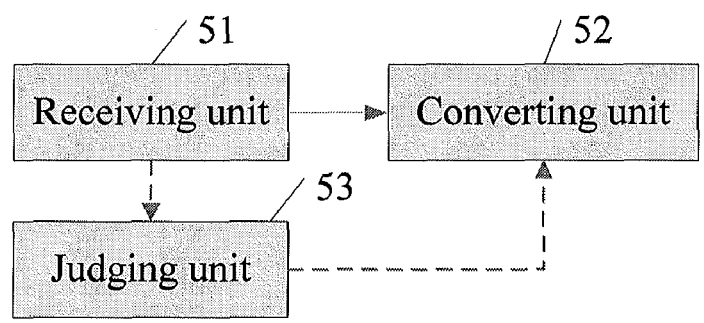
FIG. 6 shows a structure of an apparatus for transmitting a signal in the sixth embodiment of the present invention.

As shown in FIG. 6, the apparatus in fifth embodiment may further include: a judging unit 53, configured to judge whether the transmission between the apparatus and a third node is based on a TDM network, where the third node is the next hop of the GTT signal. Accordingly, the converting unit 42 converts the GTT signal in the CTM format into the GTT signal in the format of the international text telephone modem standard if the judgment result of the judging unit is positive.

In practice, the apparatus shown in FIG. 5 or FIG. 6 may be a gateway office or another device of similar functions.

Through the apparatus for transmitting a signal in the sixth embodiment, after the Nb/Nc interface is IP-based, because the CTM signal has strong anti-interference abilities, the impact caused by the IP network on the GTT signal is mitigated, and normal communication is ensured between the calling party and the called party.

Figure 7:
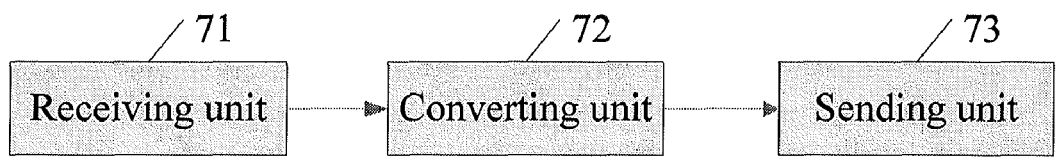
FIG. 7 shows an apparatus for transmitting a signal in a seventh embodiment of the present invention.

As shown in FIG. 7, an apparatus for transmitting a signal is provided in the seventh embodiment of the present invention. The apparatus includes: a receiving unit 71, configured to receive a GTT signal; a converting unit 72, configured to convert the MT signal into a GTT signal in a CTM format if determining that the GTT signal received by the receiving unit are in a format of an international text telephone modem standard; and a sending unit 73, configured to send the GTT signal in the CTM format, and send a service message that carries an identifier of the GTT signal in the CTM format, where the identifier indicates that the GTT signal is in the CTM format.

In practice, the apparatus shown in FIG. 7 may be a gateway office or another device of similar functions.

Through the apparatus for transmitting a signal in the seventh embodiment, after the Nb/Nc interface is IP-based, because the CTM signal has strong anti-interference abilities, the impact caused by the IP network on the GTT signal is mitigated, and normal communication is ensured between the calling party and the called party.

In conclusion, by using the method, apparatus, and system for transmitting a signal in the embodiments of the present invention, after the first node receives the GTT signal, the first node sends the GTT signal encoded in the CTM format to the second node if the transmission between the first node and the second node is based on an IP network. Therefore, after the Nb/Nc interface is IP-based, because the CTM signal has strong anti-interference abilities, the impact caused by the IP network on the GTT signal is mitigated, and normal communication is ensured between the calling party and the called party.

The previous descriptions are merely exemplary embodiments of the present invention, but not intended to limit the protection scope of the present invention. Any modifications, variations or replacements that can be easily derived by those skilled in the art shall fall within the protection scope of the present invention. Therefore, the protection scope of the present invention is subject to the appended claims.

What is claimed is:

1. A method for transmitting a signal, comprising:
   receiving, by a first node, a Global Text Telephone (GTT) signal;
   sending, by the first node, the GTT signal encoded in a Cellular Text Telephone Modem (CTM) format to a second node, if determining that transmission between the first node and the second node is based on an Internet Protocol (IP) network;
   wherein the GTT signal is a service message that comprises an identifier of the GTT signal in the CTM format, wherein the identifier indicates that the GTT signal transmitted between the first node and the second node are in the CTM format;
   wherein the first node is an end office of mobile services, the second node is a gateway office, and the sending, by the first node, the GTT signal in the CTM format to the second node comprises:
   determining, by the end office of mobile services, that the received GTT signal is in the CTM format, and sending the GTT signal in the CTM format to the gateway office;
   wherein the method further comprises:
   determining, by the gateway office, an encoding format of the GTT signal according to the identifier of the GTT signal in the CTM format;
   determining, by the gateway office, whether transmission between the gateway office and a third node is based on a Time Division Multiplexing (TDM) network, wherein the third node is a next hop of the GTT signal; and
   if the transmission between the gateway office and the third node is based on the TDM network, converting the MT signal in the CTM format into a GTT signal in a format of the international text telephone modem standard, wherein the format of the international text telephone modem standard comprises V.21, EDT, Bell 103, V.23, DTMF, V.18, and Baudot.

2. The method according to claim 1, wherein:
   the service message comprises an Initial Address Message (IAM), a Session Initiation Protocol (SIP)-I INVITE message, an Address Complete Message (ACM), or a SIP-I 180/183 message.

3. The method according to claim 2, wherein:
   when the service message is an IAM or a SIP-I INVITE message, a Forward Call Indicators field in the IAM or SIP-I INVITE message is extended to carry the identifier of the GTT signal in the CTM format.

4. The method for transmitting a signal according to claim 1, further comprising:
   determining, by the gateway office, whether the third node belong to a Public Switched Telephone Network (PSTN), if it is, determining that the transmission between the gateway office and the third node is based on the TDM network.

5. An apparatus, comprising:
   a receiving unit, configured to receive a Global Text Telephone (GTT) signal; and
   a sending unit, configured to send the GTT signal encoded in a Cellular Text Telephone Modem (CTM) format to a next hop of the GTT signal if determining that transmission between the apparatus and the next hop is based on an Internet Protocol (IP) network;
wherein the GTT signal is a service message that comprises an identifier of the GTT signal in the CTM format, wherein the identifier indicates that the GTT signal transmitted between the apparatus and the next hop are in the CTM format;
wherein the apparatus is an end office of mobile services, the next hop is a gateway office, and the sending, by the apparatus, the GTT signal in the CTM format to the next hop comprises:
determining, by the end office of mobile services, that the received GTT signal is in the CTM format, and sending the GTT signal in the CTM format to the gateway office; and
determining, by the gateway office, an encoding format of the GTT signal according to the identifier of the GTT signal in the CTM format;
determining, by the gateway office, whether transmission between the gateway office and a third node is based on a Time Division Multiplexing (TDM) network, wherein the third node is a next hop to the gateway office; and
if the transmission between the gateway office and the third node is based on the TDM network, converting the GTT signal in the CTM format into the GTT signal in the format of the international text telephone modem standard, wherein the format of the international text telephone modem standard comprises V.21, EDT, Bell 103, V.23, DTMF, V.18, and Baudot.

6. A system, comprising:
an end office of mobile services, configured to send a Global Text Telephone (GTT) signal encoded in a Cellular Text Telephone Modem (CTM) format to a gateway office if determining that transmission between the end office of mobile services and the gateway office is based on an Internet Protocol (IP) network; and
the gateway office, configured to receive the GTT signal in the CTM format from the end office of mobile services;
wherein the GTT signal is a service message that comprises an identifier of the GTT signal in the CTM format, wherein the identifier indicates that the GTT signal transmitted between the end office and the gateway office are in the CTM format;
and the sending, by the end office, the GTT signal in the CTM format to the gateway office comprises:
determining, by the end office of mobile services, that the received GTT signal is in the CTM format, and sending the GTT signal in the CTM format to the gateway office; and
determining, by the gateway office, an encoding format of the GTT signal according to the identifier of the GTT signal in the CTM format;
determining, by the gateway office, whether transmission between the gateway office and a third node is based on a Time Division Multiplexing (TDM) network, wherein the third node is a next hop to the gateway office; and
if the transmission between the gateway office and the third node is based on the TDM network, converting the GTT signal in the CTM format into the GTT signal in the format of the international text telephone modem standard, wherein the format of the international text telephone modem standard comprises V.21, EDT, Bell 103, V.23, DTMF, V.18, and Baudot.

\* \* \* \* \*